US011390931B2

(12) United States Patent
Kimura et al.

(10) Patent No.: US 11,390,931 B2
(45) Date of Patent: Jul. 19, 2022

(54) HOT-ROLLED STEEL PLATE AND METHOD FOR MANUFACTURING SAME

(71) Applicant: JFE Steel Corporation, Tokyo (JP)

(72) Inventors: Hideyuki Kimura, Tokyo (JP); Takeshi Yokota, Tokyo (JP); Satoshi Tsutsumi, Tokyo (JP)

(73) Assignee: JFE Steel Corporation, Tokyo (JP)

( * ) Notice: Subject to any disclaimer, the term of this patent is extended or adjusted under 35 U.S.C. 154(b) by 58 days.

(21) Appl. No.: 16/955,153

(22) PCT Filed: Dec. 11, 2018

(86) PCT No.: PCT/JP2018/045414
§ 371 (c)(1),
(2) Date: Jun. 18, 2020

(87) PCT Pub. No.: WO2019/131100
PCT Pub. Date: Jul. 4, 2019

(65) Prior Publication Data
US 2020/0385839 A1 Dec. 10, 2020

(30) Foreign Application Priority Data
Dec. 25, 2017 (JP) .............................. JP2017-247170

(51) Int. Cl.
*C21D 9/46* (2006.01)
*C21D 6/00* (2006.01)
*C21D 8/02* (2006.01)
*C22C 38/00* (2006.01)
*C22C 38/02* (2006.01)
*C22C 38/04* (2006.01)
*C22C 38/06* (2006.01)
*C22C 38/42* (2006.01)
*C22C 38/44* (2006.01)
*C22C 38/46* (2006.01)
*C22C 38/48* (2006.01)
*C22C 38/50* (2006.01)
*C22C 38/54* (2006.01)
*C22C 38/58* (2006.01)

(52) U.S. Cl.
CPC .............. *C21D 9/46* (2013.01); *C21D 6/005* (2013.01); *C21D 6/008* (2013.01); *C21D 8/0205* (2013.01); *C21D 8/0226* (2013.01); *C22C 38/001* (2013.01); *C22C 38/002* (2013.01); *C22C 38/005* (2013.01); *C22C 38/02* (2013.01); *C22C 38/04* (2013.01); *C22C 38/06* (2013.01); *C22C 38/42* (2013.01); *C22C 38/44* (2013.01); *C22C 38/46* (2013.01); *C22C 38/48* (2013.01); *C22C 38/50* (2013.01); *C22C 38/54* (2013.01); *C22C 38/58* (2013.01); *C21D 2211/002* (2013.01); *C21D 2211/004* (2013.01); *C21D 2211/005* (2013.01); *C21D 2211/008* (2013.01)

(58) Field of Classification Search
CPC ................ C21D 1/19; C21D 2211/002; C21D 2211/004; C21D 2211/005; C21D 2211/008; C21D 6/002; C21D 6/004; C21D 6/005; C21D 6/008; C21D 8/0205; C21D 8/0226; C21D 8/0263; C21D 8/1227; C21D 9/08; C21D 9/46; C22C 38/001; C22C 38/002; C22C 38/005; C22C 38/02; C22C 38/04; C22C 38/06; C22C 38/08; C22C 38/12; C22C 38/14; C22C 38/16; C22C 38/18; C22C 38/20; C22C 38/22; C22C 38/24; C22C 38/42; C22C 38/44; C22C 38/46; C22C 38/48; C22C 38/50; C22C 38/54; C22C 38/58; F16L 9/02
See application file for complete search history.

(56) References Cited
U.S. PATENT DOCUMENTS

2010/0258219 A1  10/2010  Ahn et al.
2014/0190597 A1  7/2014  Hara et al.
(Continued)

FOREIGN PATENT DOCUMENTS

CN  1256716 A       6/2000
CN  102851600 A  *  1/2013
(Continued)

OTHER PUBLICATIONS

Fu, J., "Quantitative Study of Carbonitride Precipitation in Niobium and Titanium Microalloyed Hot Strip Steel," The Charles Hatchett Award Paper, Mar. 31, 2002, 3 pages, Printing Plant in Beijing Institute of Technology.
(Continued)

*Primary Examiner* — Jenny R Wu
(74) *Attorney, Agent, or Firm* — RatnerPrestia

(57) ABSTRACT

A hot-rolled steel plate has a predetermined chemical composition and a microstructure. In the microstructure, in a plate thickness 1/2 position, an area fraction of martensite is less than 3%, an area fraction of bainitic ferrite is 95% or greater, the bainitic ferrite has an average grain diameter of 6.0 μm or less, an amount of Nb precipitated as Nb carbonitride is 0.025 mass % or greater, and an amount of Nb precipitated as Nb carbonitride having a grain diameter of 20 nm or greater constitutes 50% or greater of a total mass of the Nb precipitated as Nb carbonitride. The hot-rolled steel plate has a tensile strength of 640 MPa or greater, a yield ratio of 85% or less, a Charpy impact absorbed energy at −40° C. of 300 J or greater, and a percent ductile fracture (SA value) of 85% or greater as determined by a DWTT test at −40° C.

4 Claims, No Drawings

(56) References Cited

U.S. PATENT DOCUMENTS

| | | | |
|---|---|---|---|
| 2016/0289788 A1 | 10/2016 | Shibata et al. | |
| 2018/0340238 A1* | 11/2018 | Kimura | ................ C22C 38/001 |

FOREIGN PATENT DOCUMENTS

| | | | |
|---|---|---|---|
| CN | 102851600 A | 1/2013 | |
| EP | 0980915 A1 | 2/2000 | |
| EP | 2309014 | 4/2011 | |
| JP | 541226 A | 1/1979 | |
| JP | 07268467 A | 10/1995 | |
| JP | 2003003231 A | 1/2003 | |
| JP | 2004076101 A | 3/2004 | |
| JP | 2009127071 A | 6/2009 | |
| JP | 2011017061 A | 1/2011 | |
| JP | 5521482 B2 | 6/2014 | |
| JP | 2015101781 A | 6/2015 | |
| JP | 2015175039 A | 10/2015 | |
| JP | 2017214618 A | 12/2017 | |
| KR | 20030039593 A | 5/2003 | |
| KR | 20130048980 A | 5/2013 | |
| KR | 101306418 B1 | 9/2013 | |
| WO | 2013047702 A1 | 4/2013 | |
| WO | 2016157862 A1 | 10/2016 | |
| WO | WO-2016157862 A1 * | 10/2016 | ............. C22C 38/54 |

OTHER PUBLICATIONS

Kang, Y. et al., "Control on Microstructure and Properties of Steel Produced by Thin Slab Continuous Casting and Continuous Rolling," Mar. 31, 2006, 2 pages, Metallurgical Industry Press.
Chinese Office Action with Search Report for Chinese Application No. 201880083129.X, dated Apr. 6, 2021, 13 pages.
Chinese Office Action with Search Report for Chinese Application No. 201880083129.X, dated Oct. 13, 2021, 12 pages.
Extended European Search Report for European Application No. 18896251.8, dated Sep. 14, 2020, 9 pages.
Canadian Office Action for Canadian Application No. 3,086,987, dated Jul. 29, 2021, 4 pages.
International Search Report and Written Opinion for International Application No. PCT/JP2018/045414, dated Mar. 19, 2019, 5 pages.
Korean Office Action for Korean Application No. 10-2020-7017951, dated Nov. 16, 2021, with Concise Statement of Relevance of Office Action, 7 pages.
Korean Grant of Patent for Korean Application No. 10-2020-7017951, dated May 10, 2022 with translation, 4 pages.

* cited by examiner

HOT-ROLLED STEEL PLATE AND METHOD FOR MANUFACTURING SAME

CROSS REFERENCE TO RELATED APPLICATIONS

This is the U.S. National Phase application of PCT/JP2018/045414, filed Dec. 11, 2018, which claims priority to Japanese Patent Application No. 2017-247170 filed Dec. 25, 2017, the disclosures of these applications being incorporated herein by reference in their entireties for all purposes.

FIELD OF THE INVENTION

The present invention relates to a hot-rolled steel plate and a method for manufacturing the same. Specifically, the present invention relates to a high-strength, high-toughness hot-rolled steel plate having a high absorbed energy and to a method for manufacturing the same. In particular, the present invention relates to a hot-rolled steel plate suitable for application to high-strength electric resistance welded steel pipes and high-strength spiral steel pipes for line pipe use that have high strength, a high Charpy impact absorbed energy, and an excellent DWTT property, and the present invention relates to a method for manufacturing the same.

BACKGROUND OF THE INVENTION

For line pipes, which are used to transport natural gas, crude oil, and the like, it is desired to improve transport efficiency with high-pressure operation. Accordingly, a need for increased strength is significantly growing. In particular, line pipes for transporting high-pressure gas need to have not only material properties required in typical structural steels, such as strength and toughness, but also material properties related to fracture resistance that is specific to gas line pipes.

Fracture toughness values of typical structural steels represent resistance properties associated with brittle fracture and are, therefore, used as indices for making a design for preventing brittle fracture in usage environments. For high-pressure gas line pipes, however, only inhibiting brittle fracture is not sufficient to avoid a large-scale fracture, that is, inhibiting a ductile fracture called unstable ductile fracture is also necessary.

Unstable ductile fracture is a phenomenon in which, in a high-pressure gas line pipe, ductile fracture propagates at a velocity of not less than 100 m/s in a pipe axis direction, which can result in a large-scale fracture over several kilometers. From past investigation results, it is known that an effective way to inhibit unstable ductile fracture is to improve the Charpy impact absorbed energy, and, accordingly, there is a need for a high Charpy impact absorbed energy (inhibition of ductile fracture). Furthermore, there is a DWTT (Drop Weight Tear Test) value (a fracture appearance transition temperature at which the percent ductile fracture reaches 85%), which is a value specified based on the results of past gas burst tests of full-scale pipes. Accordingly, there is a need for an excellent DWTT property (low-temperature toughness).

In addition, there is a tendency for the recent development of gas fields and oil fields to expand to arctic regions, such as Russia and Alaska, cold regions, such as the North Sea, seismic regions, and permafrost areas. Accordingly, line pipes to be laid need to be inhibited from brittle fracture and ductile fracture, and, in addition, in some cases, are required to have a low yield ratio so as to ensure safety in cases where a large deformation due to ground deformation occurs.

To address such a requirement, Patent Literature 1 discloses a steel product for line pipe application having excellent brittle fracture resistance properties and ductile fracture resistance properties and also discloses a method for manufacturing the same. According to the disclosure, a steel contains, in mass %, C: 0.04 to 0.09%, Si: 0.01 to 0.50%, Mn: 0.5 to 1.6%, Nb: 0.010 to 0.100%, and Mo: 0.02 to 0.50%; the steel is heated to a temperature range of 1100 to 1300° C.; subsequently, rolling is completed in a temperature range of 750 to 900° C.; and subsequently, coiling is performed in a temperature range of 400 to 550° C.

Patent Literature 2 discloses a method for manufacturing a hot coil for high-toughness sour-gas-resistant steel pipes. According to the disclosure, a continuously cast slab contains, in wt. %, C: 0.05 to 0.12%, Si: 0.10 to 0.40%, Mn: 0.50 to 1.20%, and Ca: 0.0020 to 0.0060% and further contains at least one of Ni, Cu, Cr, Mo, Nb, V, Zr, and Ti; the slab is subjected to reduction rolling at 950° C. or lower at a reduction ratio of 10% or greater and 50% or less; subsequently, cooling is performed at a surface cooling rate of 2° C./s or greater until a surface temperature reaches a temperature lower than or equal to an $Ar_3$ temperature; recuperation takes place for less than 250 s; subsequently, rolling is performed at a ratio of 50% or greater in a non-recrystallization range; the rolling is completed in a range of 720 to 820° C.; subsequently, cooling is performed at an average cooling rate of 5 to 30° C./s; and subsequently, coiling is performed in a range of 400 to 600° C.

Patent Literature 3 discloses a high-tensile-strength hot-rolled steel plate for high-strength welded steel pipes and also discloses a method for manufacturing the same. The high-tensile-strength hot-rolled steel plate has a microstructure formed of a bainitic ferrite phase and 7 vol % or less of a second phase, with 0.06% or greater of carbonitrides of Nb and V being dispersed in the bainitic ferrite phase. According to the disclosure, a steel material contains, in mass %, C: 0.03 to 0.06%, Si: 1.0% or less, Mn: 1 to 2%, Nb: 0.05 to 0.08%, V: 0.05 to 0.15%, and Mo: 0.10 to 0.30%; the steel material is heated and then hot-rolled in a temperature range of 950° C. or lower at an accumulated rolling reduction ratio of 45% or greater, with a finishing rolling temperature being (an $Ar_3$ transformation temperature—30° C.) or higher; within 10 s after completion of the hot rolling, accelerated cooling for cooling to a temperature range of 550 to 650° C. is performed at an average cooling rate of 20° C./s or greater, the temperature range and the average cooling rate being associated with a plate thickness middle; an air cooling process for air cooling takes place for 30 s or less after completion of the accelerated cooling process; subsequently, coiling is performed to form a coil; and the coiled coil is naturally cooled at an average cooling rate of 1° C./s or less.

Patent Literature 4 discloses a high-strength, high-toughness steel pipe material having excellent weldability and also discloses a method for manufacturing the same. According to the disclosure, a steel contains, in mass %, C: 0.005 to 0.020%, Si: 0.05 to 1.0%, Mn: 1.0 to 4.0%, Nb: 0.01 to 0.50%, Ti: 0.005 to 0.10%, and B: 0.0010 to 0.010% and satisfies a conditional formula for inhibiting martensite from being formed in the thermal history of welding; the steel is heated to 1000 to 1250° C. and then hot-rolled to form a steel plate; in the rolling, the accumulated rolling reduction ratio for a low-temperature austenite temperature range, which is 900° C. and lower, is 50% or greater, and the rolling finishing temperature is 700 to 850° C.; the steel plate is cooled at a cooling rate of 5° C./s or greater from a temperature of the rolling finishing temperature−50° C. or higher to a temperature of 400° C. or lower.

PATENT LITERATURE

PTL 1: Japanese Unexamined Patent Application Publication No. 2003-3231
PTL 2: Japanese Unexamined Patent Application Publication No. 7-268467
PTL 3: Japanese Unexamined Patent Application Publication No. 2011-17061
PTL 4: Japanese Unexamined Patent Application Publication No. 2004-76101

SUMMARY OF THE INVENTION

Unfortunately, in Patent Literature 1, the Charpy absorbed energies at −20° C. of examples are not greater than 235 J, and, therefore, it cannot be said that the steel products, as materials for steel pipes for line pipe application, have a high ability to arrest unstable ductile fracture. Furthermore, when the use at lower temperatures is considered, there is a concern that the steel products, as materials for steel pipes for line pipe application, may have a low level of ability to arrest unstable ductile fracture.

Furthermore, hot-rolled steel plates described in Patent Literature 2 have noticeably improved HIC resistance properties and low-temperature toughness (vTrs); however, the tensile strengths of examples are not greater than 603 MPa, and, therefore, the hot-rolled steel plates cannot satisfy the need for increased strength, which is desired to improve transport efficiency with high-pressure operation. Furthermore, it is known that vTrs tends to decrease with increasing strength, and, therefore, it cannot be necessarily said that the vTrs's of the examples are high values. In addition, there are no descriptions of a DWTT property or a Charpy absorbed energy, and, therefore, it cannot be said that the hot-rolled steel plates, as materials for steel pipes for line pipe application, have a high ability to arrest brittle fracture and unstable ductile fracture.

With regard to hot-rolled steel plates described in Patent Literature 3, the steel plates are coiled to form a coil and are then naturally cooled to allow carbonitrides of Nb and V to be precipitated. The carbonitrides that are precipitated at low temperatures are very fine and, therefore, provides a high precipitation-strengthening ability. However, an excessive increase in yield strength is also caused, which may result in an increase in the yield ratio. Invention examples of the examples have yield ratios of not less than 85.7%, and, therefore, there is a concern that the hot-rolled steel plates may have a low level of safety assurance against large deformations due to ground deformation. Furthermore, hot-rolled steel plates of examples have a small plate thickness of 12 mm, and, for example, in a case where a hot-rolled steel plate of 19 mm or greater is to be manufactured, there is a concern that the desired microstructure cannot be achieved in a plate thickness middle portion, where the cooling rate after rolling is slow, and as a result, the base steel may have a low level of toughness (vTrs).

Hot-rolled steel plates described in Patent Literature 4 have very high Charpy absorbed energies and thus have a high ability to arrest unstable ductile fracture; however, their vTrs's are not lower than −105° C., and, therefore, it cannot be said that the hot-rolled steel plates have a high low-temperature toughness (resistance to brittle fracture). Furthermore, most of the examples have a yield ratio of greater than 85%, and, therefore, there is a concern that the hot-rolled steel plates may have a low level of safety assurance against large deformations due to ground deformation.

In view of the above circumstances, an object according to aspects of the present invention is to provide a high-strength, high-toughness hot-rolled steel plate having a high absorbed energy and to provide a method for manufacturing the same, the hot-rolled steel plate having a tensile strength of 640 MPa or greater, a yield ratio of 85% or less, a Charpy impact absorbed energy at −40° C. of 300 J or greater, and a percent ductile fracture of 85% or greater as determined by a DWTT test at −40° C.

The present inventors diligently performed studies on steel plates for line pipe application, regarding various factors that affect the Charpy impact absorbed energy and DWTT property. As a result, it was found that a low-yield-ratio, high-strength, and high-toughness hot-rolled steel plate having a high Charpy impact absorbed energy and an excellent DWTT property can be obtained as follows. A composition is designed in which chemical components, such as C, Mn, Nb, and Ti, are appropriately adjusted. The accumulated rolling reduction ratio and the rolling finishing temperature for an austenite non-recrystallization temperature range are controlled. A cooling stop temperature is set to be immediately above an Ms temperature. Consequently, a microstructure can be obtained in which bainitic ferrite is present as a principal phase, martensite is reduced as much as possible, and a predetermined amount or greater amount of a carbonitride of Nb is dispersed.

A summary of aspects of the present invention is as follows.

[1] A hot-rolled steel plate including a chemical composition and a microstructure,
the chemical composition containing, in mass %,
C: 0.04% or greater and 0.08% or less,
Si: 0.01% or greater and 0.50% or less,
Mn: 1.2% or greater and 2.0% or less,
P: 0.001% or greater and 0.010% or less,
S: 0.0030% or less,
Al: 0.01% or greater and 0.08% or less,
Nb: 0.050% or greater and 0.100% or less,
Ti: 0.005% or greater and 0.025% or less,
N: 0.001% or greater and 0.006% or less, and
at least one selected from Cu: 0.01% or greater and 1.00% or less, Ni: 0.01% or greater and 1.00% or less, Cr: 0.01% or greater and 1.00% or less, Mo: 0.01% or greater and 1.00% or less, V: 0.01% or greater and 0.10% or less, and B: 0.0005% or greater and 0.0030% or less, with the balance being Fe and incidental impurities,
wherein, in the microstructure, in a plate thickness 1/2 position, an area fraction of martensite is less than 3%, an area fraction of bainitic ferrite is 95% or greater, the bainitic ferrite has an average grain diameter of 6.0 μm or less, an amount of Nb precipitated as Nb carbonitride is 0.025 mass % or greater, and an amount of Nb precipitated as Nb carbonitride having a grain diameter of 20 nm or greater constitutes 50% or greater of a total mass of the Nb precipitated as Nb carbonitride, and
wherein the hot-rolled steel plate has a tensile strength of 640 MPa or greater, a yield ratio of 85% or less, a Charpy impact absorbed energy at −40° C. of 300 J or greater, and a percent ductile fracture (SA value) of 85% or greater as determined by a DWTT test at −40° C.

[2] The hot-rolled steel plate according to [1], wherein the chemical composition further contains, in mass %, at least one selected from
Ca: 0.0005% or greater and 0.0100% or less,
REM: 0.0005% or greater and 0.0200% or less, Zr: 0.0005% or greater and 0.0300% or less, and Mg: 0.0005% or greater and 0.0100% or less.

[3] A method for manufacturing the hot-rolled steel plate according to [1] or [2], the method including:

forming a hot-rolled steel plate by heating a steel slab having the chemical composition to a temperature of 1100° C. or higher and 1250° C. or lower and then rolling the slab in an austenite recrystallization temperature range, and subsequently performing rolling in an austenite non-recrystallization temperature range at an accumulated rolling reduction ratio of greater than 75%, with a rolling finishing temperature being (an $Ar_3$ temperature+30° C.) or higher and (the $Ar_3$ temperature+130° C.) or lower;

thereafter cooling the hot-rolled steel plate to a temperature range of an Ms temperature or higher and (the Ms temperature+150° C.) or lower by accelerated cooling at an average cooling rate of 10° C./s or greater and 60° C./s or less, the temperature range and the average cooling rate being associated with a plate thickness middle; and coiling the hot-rolled steel plate at a temperature of 450° C. or higher and 600° C. or lower.

[4] A method for manufacturing the hot-rolled steel plate according to [1] or [2], the method including:

forming a hot-rolled steel plate by heating a steel slab having the chemical composition to a temperature of 1100° C. or higher and 1250° C. or lower and then subjecting the slab to primary rough rolling in an austenite recrystallization temperature range, subsequently cooling the slab to an austenite non-recrystallization temperature range at an average cooling rate of 1.5° C./s or greater, the average cooling rate being associated with a plate thickness middle, and performing secondary rough rolling and finish rolling in the austenite non-recrystallization temperature range at an accumulated rolling reduction ratio of the secondary rough rolling and the finish rolling of greater than 75%, with a finishing delivery temperature being (an $Ar_3$ temperature+30° C.) or higher and (the $Ar_3$ temperature+130° C.) or lower;

thereafter cooling the hot-rolled steel plate to a temperature range of an Ms temperature or higher and (the Ms temperature+150° C.) or lower by accelerated cooling at an average cooling rate of 10° C./s or greater and 60° C./s or less, the temperature range and the average cooling rate being associated with the plate thickness middle; and coiling the hot-rolled steel plate at a temperature of 450° C. or higher and 600° C. or lower.

In accordance with aspects of the present invention, a steel microstructure in which bainitic ferrite is present as a principal constituent and a predetermined amount or greater amount of a carbonitride of Nb is dispersed can be obtained. The steel microstructure is achieved by appropriately controlling the rolling conditions and the post-rolling cooling conditions. Consequently, a steel plate having a tensile strength of 640 MPa or greater, a yield ratio of 85% or less, a Charpy impact absorbed energy at −40° C. of 300 J or greater, and a percent ductile fracture of 85% or greater as determined by a DWTT test at −40° C. is provided, which is very beneficial for the industry.

DETAILED DESCRIPTION OF EMBODIMENTS OF THE INVENTION

Embodiments of the present invention will now be described in detail.

First, reasons for the limitations on the chemical composition according to aspects of the present invention will be described. Note that in the context of components, "%" means mass %.

C: 0.04% or Greater and 0.08% or Less

C forms a microstructure mainly of bainitic ferrite after accelerated cooling, and acts effectively to increase the strengthening transformation. If the C content is less than 0.04%, however, polygonal ferrite transformation and pearlite transformation tend to occur during cooling, and as a result, the predetermined amount of bainitic ferrite may not be achieved, and, therefore, the desired tensile strength 640 MPa) may not be achieved. On the other hand, if the C content is greater than 0.08%, hard martensite tends to form after accelerated cooling, and as a result, the base steel may have a low Charpy impact absorbed energy and DWTT property. Accordingly, the C content is 0.04% or greater and 0.08% or less. It is preferable that the C content be 0.04% or greater and 0.07% or less.

Si: 0.01% or Greater and 0.50% or Less

Si is an element necessary for deoxidation and has an effect of improving the strength of hot-rolled steel plates through solid solution strengthening. The amount of addition of Si necessary to produce the effect is greater than or equal to 0.01%. On the other hand, if the Si content is greater than 0.50%, the quality of welds is degraded, and the toughness of weld heat-affected zones is degraded. Furthermore, red scale is noticeably formed, which degrades the appearance characteristic of steel plates. Accordingly, the Si content is 0.01% or greater and 0.50% or less. It is preferable that the Si content be 0.01% or greater and 0.20% or less.

Mn: 1.2% or Greater and 2.0% or Less

Similarly to C, Mn forms a microstructure mainly of bainitic ferrite after accelerated cooling, and acts effectively to increase the strengthening transformation. If the Mn content is less than 1.2%, however, polygonal ferrite transformation and pearlite transformation tend to occur during cooling, and as a result, the predetermined amount of bainitic ferrite may not be achieved, and, therefore, the desired tensile strength 640 MPa) may not be achieved. On the other hand, if the Mn content is greater than 2.0%, Mn is concentrated in a segregation portion that is inevitably formed during casting, and the portion causes degradation of the Charpy impact absorbed energy and DWTT property. Accordingly, the Mn content is 1.2% or greater and 2.0% or less. It is preferable that the Mn content be 1.2% or greater and 1.8% or less.

P: 0.001% or Greater and 0.010% or Less

P is an element effective for increasing the strength of hot-rolled steel plates through solid solution strengthening. If the P content is less than 0.001%, however, the effect may not be produced, and also, the cost of dephosphorization in the steel-making process may increase. Accordingly, the P content is greater than or equal to 0.001%. On the other hand, if the P content is greater than 0.010%, toughness and weldability are noticeably degraded. Accordingly, the P content is 0.001% or greater and 0.010% or less.

S: 0.0030% or Less

S is a harmful element that causes hot shortness and, in addition, reduces toughness and ductility by being present as sulfide-based inclusions in steel. Accordingly, it is preferable to reduce S as much as possible; in accordance with aspects of the present invention, the upper limit of the S content is 0.0030%. It is preferable that the S content be less than or equal to 0.0015%. The lower limit of the S content is not particularly limited, but extremely reducing S results in an increase in the cost of steel-making. Accordingly, it is preferable that the S content be greater than or equal to 0.0001%.

Al: 0.01% or Greater and 0.08% or Less

Al is an element to be included as a deoxidizer agent. Furthermore, Al has a solid solution strengthening ability and, therefore, effectively acts to increase the strength of hot-rolled steel plates. If the Al content is less than 0.01%, however, the effect cannot be produced. On the other hand, if the Al content is greater than 0.08%, the cost of the raw material increases, and toughness may decrease. Accordingly, the Al content is 0.01% or greater and 0.08% or less. It is preferable that the Al content be 0.01% or greater and 0.05% or less.

Nb: 0.050% or Greater and 0.100% or Less

Nb has an effect of expanding an austenite non-recrystallization temperature range for hot rolling and is, therefore, effective for improving toughness through a refining effect, which is produced by performing rolling in an austenite non-recrystallization range. Furthermore, when Nb is finely precipitated as a carbonitride, Nb increases the strength of hot-rolled steel plates without compromising weldability. To produce these effects, Nb is added in an amount greater than or equal to 0.050%. On the other hand, if the Nb content is greater than 0.100%, hard martensite tends to form after accelerated cooling, and as a result, the base steel may have a low Charpy impact absorbed energy and DWTT property. Accordingly, the Nb content is 0.050% or greater and 0.100% or less. It is preferable that the Nb content be 0.050% or greater and 0.080% or less.

Ti: 0.005% or Greater and 0.025% or Less

Ti forms a nitride in steel. In particular, addition of Ti in an amount greater than or equal to 0.005% produces a pinning effect of a nitride, which results in an effect of refining austenite grains, and, therefore, Ti contributes to ensuring the toughness of base steels and the toughness of weld heat-affected zones. Furthermore, Ti is an element effective for increasing the strength of hot-rolled steel plates through precipitation strengthening. The amount of addition of Ti necessary to produce these effects is greater than or equal to 0.005%. On the other hand, if Ti is added in an amount greater than 0.025%, TiN coarsens, and as a result, Ti no longer contributes to the refining of austenite grains. Consequently, the toughness improving effect is not produced, and moreover, coarse TiN acts as initiation sites for ductile fracture and brittle fracture, which results in a significantly low Charpy impact absorbed energy and DWTT property. Accordingly, the Ti content is 0.005% or greater and 0.025% or less. It is preferable that the Ti content be greater than or equal to 0.008%. It is preferable that the Ti content be less than or equal to 0.018%.

N: 0.001% or Greater and 0.006% or Less

N forms a nitride with Ti, thereby inhibiting coarsening of austenite to contribute to improving toughness. To produce such a pinning effect, the N content is specified to be greater than or equal to 0.001%. On the other hand, if the N content is greater than 0.006%, the following may occur: in a case where TiN is decomposed in a weld, particularly a weld heat-affected zone (HAZ) heated to 1450° C. or higher near the fusion line, the toughness of the HAZ zone associated with dissolved N may be noticeably decreased. Accordingly, the N content is 0.001% or greater and 0.006% or less. In a case where a high level of toughness of a weld heat-affected zone is required, it is preferable that the N content be 0.001% or greater and 0.004% or less.

In accordance with aspects of the present invention, in addition to the essential additive elements described above, at least one element selected from Cu, Ni, Cr, Mo, V, and B is added.

At least one selected from Cu: 0.01% or greater and 1.00% or less, Ni: 0.01% or greater and 1.00% or less, Cr: 0.01% or greater and 1.00% or less, Mo: 0.01% or greater and 1.00% or less, V: 0.01% or greater and 0.10% or less, and B: 0.0005% or greater and 0.0030% or less Cu: 0.01% or Greater and 1.00% or Less, Cr: 0.01% or Greater and 1.00% or Less, and Mo: 0.01% or Greater and 1.00% or Less Cu, Cr, and Mo are hardenability improving elements. Cu, Cr, and Mo effectively act to ensure that the microstructure after accelerated cooling is a microstructure in which bainitic ferrite is present as a principal constituent so that increased strength can be achieved through transformation strengthening. The Cu content, the Cr content, and the Mo content that are necessary to produce the effect are, independently, greater than or equal to 0.01%. On the other hand, if the Cu content, the Cr content, and the Mo content are, independently, greater than 1.00%, the effect of increasing strength is no longer produced, and, in addition, hard martensite tends to form after accelerated cooling, and as a result, the base steel may have a low Charpy impact absorbed energy and DWTT property. Accordingly, in cases where Cu, Cr, and/or Mo are added, the content is 0.01% or greater and 1.00% or less (for Cu, Cr, and Mo, independently). Preferably, the Cu content is 0.01% or greater and 0.40% or less, the Cr content is 0.01% or greater and 0.50% or less, and the Mo content is 0.01% or greater and 0.50% or less.

Ni: 0.01% or Greater and 1.00% or Less

Ni is also a hardenability improving element. Addition of Ni does not cause degradation of toughness, and, therefore, Ni is a useful element. The amount of addition of Ni necessary to produce this effect is greater than or equal to 0.01%. On the other hand, Ni is very expensive, and if the Ni content is greater than 1.00%, effects of Ni are no longer produced. Accordingly, in the case where Ni is added, the Ni content is 0.01% or greater and 1.00% or less. It is preferable that the Ni content be 0.01% or greater and 0.40% or less.

V: 0.01% or Greater and 0.10% or Less

Similarly to Nb, V is an element that has an effect of, when finely precipitated as a carbonitride, increasing the strength of hot-rolled steel plates without compromising weldability. The amount of addition of V necessary to produce this effect is greater than or equal to 0.01%. On the other hand, if the V content is greater than 0.10%, the effect of increasing strength is no longer produced, and, in addition, weldability may decrease. Accordingly, in the case where V is added, the V content is 0.01% or greater and 0.10% or less. It is preferable that the V content be 0.01% or greater and 0.05% or less.

B: 0.0005% or Greater and 0.0030% or Less

B segregates at austenite grain boundaries and inhibits ferrite transformation. Therefore, B particularly contributes to the prevention of strength reduction of the HAZ region. The amount of addition of B necessary to produce this effect is greater than or equal to 0.0005%. On the other hand, if the B content is greater than 0.0030%, effects of B are no longer produced. Accordingly, in the case where B is added, the B content is 0.0005% or greater and 0.0030% or less.

The balance, other than the components described above, is Fe and incidental impurities.

Furthermore, in addition to the components described above, at least one selected from the following components may be included as necessary. The components are Ca: 0.0005% or greater and 0.0100% or less, REM: 0.0005% or greater and 0.0200% or less, Zr: 0.0005% or greater and 0.0300% or less, and Mg: 0.0005% or greater and 0.0100% or less.

Ca, REM, Zr, and Mg serve to improve the toughness of steel plates by immobilizing S in steel. The effect is produced when the element is added in an amount greater than or equal to 0.0005% (for each of the components, independently). On the other hand, in the case where Ca is added in an amount greater than 0.0100%, REM in an amount greater than 0.0200%, Zr in an amount greater than 0.0300%, and/or Mg in an amount greater than 0.0100%, inclusions in the steel may increase, which may degrade toughness. Accordingly, in the case where these elements are added, the contents of Ca, REM, Zr, and Mg are, independently, Ca: 0.0005% or greater and 0.0100% or less, REM: 0.0005% or greater and 0.0200% or less, Zr: 0.0005% or greater and 0.0300% or less, and Mg: 0.0005% or greater and 0.0100% or less. Preferably, the Ca content is 0.0005% or greater and 0.0040% or less, the REM content is 0.0005% or greater and 0.0050% or less, the Zr content is 0.0005% or greater and 0.0050% or less, and the Mg content is 0.0005% or greater and 0.0050% or less.

Now, a microstructure possessed by a hot-rolled steel plate according to aspects of the present invention will be described.

A hot-rolled steel plate according to aspects of the present invention has a microstructure that enables the characteristics, that is, a tensile strength of 640 MPa or greater, a yield ratio of 85% or less, a Charpy impact absorbed energy at −40° C. of 300 J or greater, and a percent ductile fracture of 85% or greater as determined by a DWTT test at −40° C., to be consistently provided. In the microstructure, in a plate thickness 1/2 position (a 1/2 t portion with respect to a plate thickness t), an area fraction of martensite is less than 3%, an area fraction of bainitic ferrite is 95% or greater, and the bainitic ferrite has an average grain diameter of 6.0 μm or less. In addition, in the microstructure, an amount of Nb precipitated as Nb carbonitride is 0.025 mass % or greater, and an amount of Nb precipitated as Nb carbonitride having a grain diameter of 20 nm or greater constitutes 50% or greater of a total mass of the Nb precipitated as Nb carbonitride. It is to be noted that bainitic ferrite is a phase including a substructure that has a high dislocation density, and bainitic ferrite includes acicular ferrite. The remaining constituents in the microstructure may include martensite, which may constitute an area fraction of less than 3%, and may include one or more phases other than bainitic ferrite, such as ferrite and pearlite. Effects in accordance with aspects of the present invention can be produced as long as a total area fraction of the remaining constituents in the microstructure is less than 5%.

Area Fraction of Martensite in Plate Thickness 1/2 Position: Less Than 3%

As used in accordance with aspects of the present invention, the term "martensite" refers to martensite formed from untransformed austenite at prior γ (austenite) grain boundaries or within prior γ grains in a post-rolling cooling process. The martensite has a higher hardness than the principal phase and acts as initiation sites for ductile fracture and brittle fracture. Thus, an area fraction of martensite of not less than 3% results in a significantly low Charpy impact absorbed energy and DWTT property. On the other hand, when the area fraction of martensite is less than 3%, the degree of degradation of the Charpy impact absorbed energy and DWTT property is small. Accordingly, in accordance with aspects of the present invention, the area fraction of martensite in a plate thickness 1/2 position is limited to less than 3% (including 0%).

Area Fraction of Bainitic Ferrite in Plate Thickness 1/2 Position: 95% or Greater A bainitic ferrite phase is a hard phase and is effective for increasing the strength of steel plates through transformation microstructure strengthening. By ensuring that bainitic ferrite constitutes an area fraction of not less than 95%, increased strength can be achieved while stabilizing the Charpy impact absorbed energy and DWTT property at a high level. On the other hand, if the area fraction of bainitic ferrite is less than 95%, the total area fraction of the remaining constituents in the microstructure, such as ferrite, pearlite, and martensite, exceeds 5%. In such a composite microstructure, interface between different phases act as initiation sites for ductile fracture and brittle fracture, and, therefore, the target Charpy impact absorbed energy and DWTT property may not be achieved even when the desired tensile strength is satisfied. Accordingly, the area fraction of bainitic ferrite in a plate thickness 1/2 position is specified to be 95% or greater (including 100%).

Average Grain Diameter of Bainitic Ferrite in Plate Thickness 1/2 Position: 6.0 μm or Less Grain boundaries serve to resist brittle fracture propagation, and, therefore, reducing the average grain diameter of bainitic ferrite results in an improved DWTT property. To produce this effect, the average grain diameter of the bainitic ferrite is specified to be 6.0 μm or less.

Amount of Nb Precipitated as Nb Carbonitride: 0.025 Mass % or Greater, and Proportion of Amount of Nb Precipitated as Nb Carbonitride Having Grain Diameter of 20 nm or Greater: 50% or Greater of Total Mass of Nb Precipitated as Nb Carbonitride, in Plate Thickness 1/2 Position In accordance with aspects of the present invention, Nb carbonitride is appropriately controlled; the Nb carbonitride is formed as a result of strain-induced precipitation in a rolling step performed in an austenite non-recrystallization temperature range and as a result of precipitation associated with transformation during cooling and coiling. Consequently, the desired tensile strength 640 MPa) is achieved while stabilizing the Charpy impact absorbed energy and DWTT property at a high level. However, if an amount of Nb carbonitride is less than 0.025 mass % in terms of an amount of Nb precipitated as Nb carbonitride, the desired tensile strength 640 MPa) may not be achieved. Accordingly, the amount of Nb precipitated as Nb carbonitride is specified to be greater than or equal to 0.025 mass %. It is preferable that the amount of Nb precipitated as Nb carbonitride be greater than or equal to 0.030 mass %.

Furthermore, fine Nb carbonitride having a grain diameter of less than 20 nm, which are mostly precipitated during cooling after a coil is formed by coiling, excessively increases yield strength through precipitation strengthening. As a result, the desired low yield ratio 85%) may not be achieved. However, by ensuring that the amount of Nb carbonitride having a grain diameter of 20 nm or greater, in terms of the amount of Nb precipitated as Nb carbonitride having a grain diameter of 20 nm or greater, is 50% or greater of a total mass of Nb precipitated as Nb carbonitride, an increase in the yield ratio is inhibited. Consequently, the desired low yield ratio is achieved. Accordingly, the amount of Nb precipitated as Nb carbonitride having a grain diameter of 20 nm or greater is specified to be 50% or greater of the total mass of Nb precipitated as Nb carbonitride. It is preferable that the amount be greater than or equal to 60%.

The area fractions of the phases, including the bainitic ferrite, are determined in the following manner. An L cross section (a vertical cross section parallel to a rolling direction) from a plate thickness 1/2 position is mirror-polished and then etched with nital. Randomly selected five fields of view are examined with a scanning electron microscope (SEM) at a magnification of 2000×. By using a microstructure photograph that has been taken, microstructures are determined, and an area fraction of each of the phases is determined by image analysis. Furthermore, the average particle diameter of the bainitic ferrite is determined by using the intercept method specified in JIS G 0551.

Furthermore, the amount of Nb precipitated as Nb carbonitride is determined in the following manner. A test piece is cut from a plate thickness 1/2 position, and the test piece that has been cut is subjected to constant current electrolysis (approximately 20 mA/cm$^2$) in an electrolyte solution (10 vol % acetyl acetone-1 mass % tetramethylammonium chloride methanol). After the electrolysis, precipitates deposited on the sample are dispersed in an aqueous solution of sodium hexametaphosphate and then filtered out with a 0.02 μmφ aluminum filter. An amount of Nb present in the precipitates on the filter is measured by ICP emission spectroscopy. Accordingly, a content in steel of Nb precipitated as Nb precipitates having a grain diameter of 20 nm or greater, which are collected on the filter, is determined. Furthermore, for the precipitates having a grain diameter of less than 20 nm, which are present in the filtrate that has passed through the filter, the following is performed. The filtrate is evaporated to dryness, and thereafter nitric acid, perchloric acid, and sulfuric acid are added. Heating is performed for dissolution until white fumes of sulfuric acid appear. After natural cooling, hydrochloric acid is added, and then the solution is adjusted by being diluted with pure water to a predetermined amount. Subsequently, a measurement is performed by ICP emission spectroscopy. A total mass of Nb precipitated as Nb carbonitride is determined by summing the amount of Nb precipitates having a grain diameter of 20 nm or greater and the amount of Nb precipitates having a grain diameter of less than 20 nm, which are determined by using the methods described above. Furthermore, a proportion of the amount of Nb precipitated as Nb carbonitride having a grain diameter of 20 nm or greater is calculated with respect to the total mass of Nb precipitated as Nb carbonitride. Note that the amount of precipitated Nb determined with this method includes the amount of Nb precipitated in one or more phases other than the bainitic ferrite phase; however, most of the Nb is Nb precipitated in the bainitic ferrite phase.

Since the material microstructure of a steel plate manufactured by applying the accelerated cooling generally differs in the thickness direction of the steel plate, the microstructure at a position of 1/2 of the thickness where the cooling rate is slow and the above-mentioned characteristics are difficult to be achieved is defined in accordance with aspects of the present invention from the viewpoint of stably satisfying the target strength and Charpy impact absorbed energy.

Now, a method for manufacturing a hot-rolled steel plate according to aspects of the present invention will be described.

In accordance with aspects of the present invention, a method for manufacturing a hot-rolled steel plate includes a hot rolling step, an accelerated cooling step, which is performed after the hot rolling step, and a coiling step, which is performed after the accelerated cooling step. The hot rolling step includes a heating step for heating a steel slab, a rough rolling step for performing rough rolling on the steel slab to form a rough rolling steel plate, and a finish rolling step for performing finish rolling on the rough rolling steel plate to form a hot-rolled steel plate.

In the hot rolling step, a steel slab is heated to a temperature of 1100° C. or higher and 1250° C. or lower and thereafter subjected to primary rough rolling, which is performed in an austenite recrystallization temperature range; subsequently, after cooling to an austenite non-recrystallization temperature range is carried out, secondary rough rolling and finish rolling are performed. An accumulated rolling reduction ratio for the secondary rough rolling and the finish rolling is greater than 75%. A finish rolling temperature is (an Ar$_3$ temperature+30° C.) or higher and (the Ar$_3$ temperature+130° C.) or lower. Subsequently, in the accelerated cooling step, accelerated cooling is performed for cooling to a temperature range of an Ms temperature or higher and (the Ms temperature+150° C.) or lower, at an average cooling rate of 10° C./s or greater and 60° C./s or less. The temperature range and the average cooling rate are associated with a plate thickness middle. In the coiling step, coiling is performed at a temperature of 450° C. or higher and 600° C. or lower. In the following description, each of the steps will be described in detail. Note that in accordance with aspects of the present invention, temperatures such as a slab heating temperature, a rough rolling temperature, a rough rolling end temperature, a finish rolling temperature, a finish lolling end temperature, an accelerated cooling stop temperature, and a coiling temperature are surface temperatures of the slab or steel plate unless otherwise specified. Furthermore, temperatures of a plate thickness middle are temperatures of a plate thickness middle determined by calculation using a surface temperature of the slab or steel plate and taking into account parameters, such as the plate thickness and a thermal conductivity.

Slab Heating Temperature: 1100° C. or Higher and 1250° C. or Lower

A steel slab according to aspects of the present invention may be manufactured in the following manner. Molten steel having a chemical composition as described above is produced in a steelmaking process known in the art, such as by using a converter, an electric furnace, or a vacuum melting furnace, and the molten steel is subjected to a continuous casting process or an ingot casting-slabbing process. To prevent macro segregation of components, it is desirable to use a continuous casting process for the manufacturing. A process to be performed after a steel slab is manufactured may be a conventional process in which the steel slab is first cooled to room temperature and thereafter reheated. An energy-saving process may be employed without any problem. Examples of the energy-saving process include the following: hot direct rolling, in which a warm slab, without being cooled, is charged into a heating furnace and hot-rolled; hot direct rolling, in which a short period of temperature holding takes place, and thereafter hot rolling is performed immediately; and a process in which reheating is partially omitted by charging a slab into a heating furnace while the slab is still in a high temperature state (warm slab charging).

If the slab heating temperature is lower than 1100° C., deformation resistance is high, and, therefore, the rolling load increases, which results in a decrease in rolling efficiency. On the other hand, if the slab heating temperature is high, that is, higher than 1250° C., initial austenite grain diameters coarsen, which may result in a low DWTT property. Accordingly, the slab heating temperature is 1100° C.

or higher and 1250° C. or lower. It is preferable that the slab heating temperature be 1150° C. or higher and 1220° C. or lower.

Rolling in Austenite Recrystallization Temperature Range

After a slab is heated and held, rolling is performed in an austenite recrystallization temperature range. As a result, austenite is recrystallized to become fine grains, which contributes to an improved DWTT property. From the standpoint of producing such an effect easily, it is preferable that the accumulated rolling reduction ratio for an austenite recrystallization temperature range be greater than or equal to 50%. Note that within the compositional ranges of a steel according to aspects of the present invention, the minimum temperature of austenite recrystallization temperature ranges is approximately 950° C., and the rolling in an austenite recrystallization temperature range is referred to as primary rough rolling.

Average Cooling Rate Before Austenite Non-Recrystallization Temperature Range is Reached In the cooling (cooling step) performed after the primary rough rolling, cooling is performed until an austenite non-recrystallization temperature range is reached, and thus the steel strip is cooled to a temperature range that is effective for improving a DWTT property. Through the subsequent secondary rough rolling and finish rolling steps, a DWTT property can be improved effectively. With regard to the cooling rate, if the average cooling rate in a plate thickness middle is less than 1.5° C./s, the cooling time before reaching the temperature range effective for improving a DWTT property increases, which reduces productivity. Accordingly, it is preferable that the average cooling rate in a plate thickness middle be greater than or equal to 1.5° C./s; more preferably, the average cooling rate is greater than or equal to 2.0° C./s. Furthermore, in terms of ensuring the average cooling rate, it is preferable that the cooling in the cooling step be carried out by water cooling. Note that the average cooling rate is a rate obtained by dividing the temperature difference between the cooling start temperature and the cooling stop temperature by the required time. Typically, the cooling start temperature in the cooling step corresponds to a primary rough rolling finishing temperature. Furthermore, a temperature range effective for improving a DWTT property is an austenite non-recrystallization temperature range and is, for example, a temperature range of 930° C. and lower.

Rolling in Austenite Non-Recrystallization Temperature Range: Accumulated Rolling Reduction Ratio of Greater Than 75%

The rolling in an austenite non-recrystallization temperature range is carried out in the secondary rough rolling and the finish rolling, after the cooling step. In these rolling steps, reduction rolling in an austenite non-recrystallization temperature range is performed at an accumulated ratio of greater than 75%. As a result, austenite grains are elongated and become fine grains, particularly in a plate thickness direction. A steel plate obtained by performing accelerated cooling in this state has a good DWTT property. Furthermore, Nb carbonitride is formed as a result of strain-induced precipitation due to the reduction rolling in an austenite non-recrystallization temperature range. The Nb carbonitride grows and, in the resulting hot-rolled steel plate after accelerated cooling, has a grain diameter of 20 nm or greater, which contributes to increasing strength while maintaining a low yield ratio. On the other hand, if the accumulated rolling reduction ratio is less than or equal to 75%, the grain refining effect becomes insufficient, and as a result, the target DWTT property may not be achieved. In addition, strain-induced precipitation of Nb becomes insufficient, and, therefore, the predetermined amount of Nb carbonitride or Nb carbonitride having a desired size may not be achieved, and as a result, the desired tensile strength 640 MPa) or the desired yield ratio 85%) may not be achieved. Accordingly, the accumulated rolling reduction ratio for an austenite non-recrystallization temperature range is greater than 75%. In a case where a further improvement in toughness is necessary, it is preferable that the accumulated rolling reduction ratio for an austenite non-recrystallization temperature range be greater than or equal to 80%. Note that the upper limit of the accumulated rolling reduction ratio for an austenite non-recrystallization temperature range is not particularly limited but preferably less than or equal to 90% in view of a rolling load. Furthermore, in accordance with aspects of the present invention, in the rolling in an austenite non-recrystallization temperature range, the distribution of the rolling reduction ratio between the secondary rough rolling and the finish rolling is not important. It is sufficient that the total rolling reduction ratio be greater than 75%. Furthermore, in accordance with aspects of the present invention, austenite non-recrystallization temperature ranges are temperature ranges of 930° C. and lower, for example.

Rolling Finishing Temperature: ($Ar_3$ Temperature+30° C.) or Higher and ($Ar_3$ Temperature+130° C.) or Lower Heavy reduction rolling in an austenite non-recrystallization temperature range is effective for improving a DWTT property. Reduction rolling performed in a lower temperature range further increases the effect. However, in cases where rolling is performed in a low temperature range that is lower than (an $Ar_3$ temperature+30° C.), an influence of a texture developed in the austenite grains results in a tendency for separation to occur, that is, a significantly low Charpy impact absorbed energy. Furthermore, if the rolling finishing temperature is lower than or equal to the $Ar_3$ temperature, the steel is rolled after ferrite has been formed, and, therefore, a texture is developed in the deformed ferrite grains, which results in a tendency for separation to occur, that is, a significantly low Charpy impact absorbed energy. On the other hand, if the rolling finishing temperature is higher than (an $Ar_3$ temperature+130° C.), the refining effect effective for improving a DWTT property may not be sufficiently produced. Accordingly, the rolling finishing temperature (finish rolling end temperature) associated with an austenite non-recrystallization temperature range is (an $Ar_3$ temperature+30° C.) or higher and (the $Ar_3$ temperature+130° C.) or lower.

Average cooling rate for accelerated cooling: 10° C./s or greater and 60° C./s or less in plate thickness middle After completion of finish rolling, cooling is started immediately, preferably within 15 s (accelerated cooling step). The cooling rate is 10° C./s or greater and 60° C./s or less. The cooling rate is an average cooling rate in a plate thickness middle before the cooling stop temperature is reached. If the average cooling rate is less than 10° C./s, polygonal ferrite is formed during the cooling, which leads to difficulties in ensuring the desired microstructure in which bainitic ferrite is present as a principal phase, and, consequently, the desired tensile strength 640 MPa) may not be achieved, and the desired Charpy impact absorbed energy and DWTT property may not be achieved. On the other hand, if rapid cooling in which the average cooling rate is greater than 60° C./s is employed, martensitic transformation occurs particularly near a surface layer of the steel plate, which leads to an increase in the strength of the base steel but also results in a significantly low Charpy impact absorbed energy and DWTT property of the base steel.

Accordingly, the average cooling rate for the accelerated cooling is 10° C./s or greater and 60° C./s or less. It is preferable that the average cooling rate for the accelerated cooling be 10° C./s or greater and 30° C./s or less. Note that the average cooling rate is a rate obtained by dividing the temperature difference between the cooling start temperature and the cooling stop temperature by the required time. Typically, the cooling start temperature in the accelerated cooling step corresponds to the rolling finishing temperature (finish rolling end temperature) associated with an austenite non-recrystallization temperature range.

Cooling Stop Temperature for Accelerated Cooling: Ms Temperature or Higher and (Ms Temperature+150° C.) or Lower If the cooling stop temperature for the accelerated cooling is lower than the Ms temperature, martensitic transformation occurs, which leads to an increase in the strength of the base steel but may also result in a significantly low Charpy impact absorbed energy and DWTT property of the base steel. This tendency is particularly noticeable near a surface layer of the steel plate. On the other hand, if the cooling stop temperature is higher than (an Ms temperature+150° C.), ferrite and/or pearlite are formed during a cooling process after the cooling is stopped. As a result, the desired DWTT property and Charpy impact absorbed energy may not be achieved. Furthermore, fine Nb carbonitride may be excessively formed, which may result in an increase in yield strength. As a result, the desired low yield ratio 85%) may not be achieved. Accordingly, the cooling stop temperature for the accelerated cooling is an Ms temperature or higher and (the Ms temperature+150° C.) or lower. It is preferable that the cooling stop temperature for the accelerated cooling be an Ms temperature or higher and (the Ms temperature+100° C.) or lower.

Coiling Temperature: 450° C. or Higher and 600° C. or Lower

If the coiling temperature is lower than 450° C. in the step in which, after the accelerated cooling, a coil is formed by coiling and cooled, martensitic transformation occurs, which may result in a significantly low Charpy impact absorbed energy and DWTT property of the base steel. On the other hand, if the coiling temperature is higher than 600° C., fine Nb carbonitride may be excessively formed, which may result in an increase in yield strength. As a result, the desired low yield ratio (≤85%) may not be achieved. Accordingly, the coiling temperature is 450° C. or higher and 600° C. or lower. It is preferable that the coiling temperature be 500° C. or higher and 600° C. or lower.

Note that in accordance with aspects of the present invention, the $Ar_3$ temperatures and the Ms temperatures are values obtained by calculation using the following equations, which are based on the contents of the elements in steel materials.

$Ar_3$ temperature (° C.)=910-310C-80Mn-20Cu-15Cr-55Ni-80Mo

Ms temperature (° C.)=550-361C-39Mn-35V-20Cr-17Ni-10Cu-5(Mo+W)+15Co+30Al

In the equations above, the symbols of elements each represent the content (mass %) of the element in the steel, and elements not included are indicated by 0 (zero).

EXAMPLES

Examples of the present invention will now be described.

Example 1

Molten steels having the respective chemical compositions shown in Table 1 were produced in a steelmaking process using a converter, and then slabs having a thickness of 220 mm were formed. Subsequently, a hot rolling step (heating step, primary rough rolling step, cooling step, secondary rough rolling step, and finish rolling step), an accelerated cooling step, and a coiling step were sequentially performed under the conditions shown in Table 2. Thus, hot-rolled steel plates having a plate thickness of 22 mm were manufactured.

TABLE 1

| Steel No. | Chemical components (mass %) | | | | | | | | | | | |
|---|---|---|---|---|---|---|---|---|---|---|---|---|
| | C | Si | Mn | P | S | Al | Nb | Ti | N | Cu | Ni | Cr |
| A | 0.02 | 0.15 | 1.5 | 0.007 | 0.0006 | 0.03 | 0.050 | 0.015 | 0.005 | 0.25 | 0.15 | 0.25 |
| B | 0.04 | 0.20 | 1.7 | 0.006 | 0.0005 | 0.03 | 0.090 | 0.008 | 0.004 | — | — | 0.30 |
| C | 0.05 | 0.10 | 1.6 | 0.006 | 0.0006 | 0.03 | 0.080 | 0.010 | 0.004 | — | — | 0.30 |
| D | 0.06 | 0.15 | 1.4 | 0.007 | 0.0004 | 0.03 | 0.070 | 0.010 | 0.003 | — | — | 0.20 |
| E | 0.06 | 0.05 | 1.7 | 0.005 | 0.0005 | 0.03 | 0.070 | 0.015 | 0.003 | — | — | — |
| F | 0.07 | 0.20 | 1.6 | 0.008 | 0.0011 | 0.04 | 0.060 | 0.015 | 0.003 | 0.25 | 0.20 | — |
| G | 0.08 | 0.15 | 1.7 | 0.007 | 0.0014 | 0.05 | 0.050 | 0.015 | 0.003 | 0.15 | 0.15 | — |
| H | 0.08 | 0.45 | 1.7 | 0.005 | 0.0019 | 0.05 | 0.070 | 0.025 | 0.004 | 0.25 | 0.20 | 0.25 |
| I | 0.06 | 0.20 | 1.5 | 0.008 | 0.0022 | 0.02 | 0.070 | 0.020 | 0.004 | — | — | 0.20 |
| J | 0.05 | 0.15 | 1.6 | 0.006 | 0.0023 | 0.03 | 0.110 | 0.020 | 0.004 | 0.15 | 0.15 | 0.15 |
| K | 0.10 | 0.30 | 1.6 | 0.005 | 0.0028 | 0.05 | 0.060 | 0.005 | 0.003 | 0.15 | 0.05 | — |
| L | 0.05 | 0.20 | 2.2 | 0.005 | 0.0006 | 0.03 | 0.080 | 0.010 | 0.003 | 0.05 | 0.05 | — |
| M | 0.06 | 0.20 | 1.1 | 0.005 | 0.0006 | 0.03 | 0.070 | 0.010 | 0.003 | — | — | 0.30 |
| N | 0.05 | 0.20 | 1.6 | 0.005 | 0.0023 | 0.03 | 0.080 | 0.030 | 0.005 | — | — | 0.25 |
| O | 0.06 | 0.20 | 1.6 | 0.005 | 0.0006 | 0.03 | 0.070 | 0.003 | 0.003 | — | — | — |
| P | 0.05 | 0.30 | 1.6 | 0.007 | 0.0023 | 0.06 | 0.030 | 0.020 | 0.005 | 0.25 | 0.15 | — |

| Steel No. | Chemical components (mass %) | | | $Ar_3$*1 | Ms*2 | |
|---|---|---|---|---|---|---|
| | Mo | V | B | Others | (° C.) | (° C.) Notes |
| A | 0.10 | 0.05 | — | — | 759 | 473 Comparative steel |
| B | 0.10 | 0.03 | — | REM: 0.0040 | 749 | 463 Invention steel |
| C | 0.05 | 0.05 | — | Ca: 0.0015 | 758 | 462 Invention steel |
| D | 0.35 | — | — | Ca: 0.0020 | 748 | 469 Invention steel |
| E | 0.25 | — | — | — | 735 | 462 Invention steel |
| F | 0.15 | — | — | — | 732 | 457 Invention steel |

TABLE 1-continued

|   |   |      |        |              |     |     |                  |
|---|---|------|--------|--------------|-----|-----|------------------|
| G | — | 0.05 | —      | Zr: 0.0020   | 738 | 451 | Invention steel  |
| H | — | —    | 0.0030 | Mg: 0.0020   | 729 | 445 | Invention steel  |
| I | 0.20 | — | —      | —            | 752 | 465 | Invention steel  |
| J | 0.15 | — | —      | —            | 741 | 463 | Comparative steel |
| K | 0.15 | — | —      | —            | 733 | 450 | Comparative steel |
| L | —    | — | —      | —            | 715 | 446 | Comparative steel |
| M | 0.30 | — | —      | —            | 775 | 479 | Comparative steel |
| N | 0.20 | — | —      | —            | 747 | 464 | Comparative steel |
| O | 0.25 | — | —      | —            | 743 | 466 | Comparative steel |
| P | 0.15 | — | —      | —            | 741 | 466 | Comparative steel |

Balance, other than components shown above, is Fe and incidental impurities

*[1]$Ar_3$ (° C.) = 910—310C—80Mn—20Cu—15Cr—55Ni—80Mo (Symbols of elements each represent content (mass %) of the element in steel, and elements not included are indicated by 0)

*[2]Ms (° C.) = 550—361C—39Mn—35V—20Cr—17Ni—10Cu—5(Mo + W) + 15Co + 30Al (Symbols of elements each represent content (mass %) of the element in steel, and elements not included are indicated by 0)

TABLE 2

| Steel plate No. | Steel No. | Transformation temperature $Ar_3$*[1] (° C.) | Transformation temperature Ms*[2] (° C.) | Heating step Heating temperature (° C.) | Heating step Slab thickness (mm) | Primary rough rolling step Reduction ratio (%) | Primary rough rolling step Primary rough rolling finishing temperature (° C.) | Primary rough rolling step Post-primary-rough-rolling plate thickness (mm) | Cooling step Average cooling rate in plate thickness middle (° C./s) | Cooling step Cooling stop temperature (° C.) | Secondary rough rolling step Reduction ratio (%) | Secondary rough rolling step Secondary rough rolling finishing temperature (° C.) |
|---|---|---|---|---|---|---|---|---|---|---|---|---|
| 1 | A | 759 | 473 | 1170 | 220 | 54.5 | 950 | 100 | 2.0 | 930 | 30.0 | 860 |
| 2 | B | 749 | 463 | 1170 | 220 | 54.5 | 950 | 100 | 2.0 | 930 | 30.0 | 860 |
| 3 | C | 758 | 462 | 1170 | 220 | 54.5 | 950 | 100 | 2.0 | 930 | 30.0 | 860 |
| 4 | D | 748 | 469 | 1170 | 220 | 54.5 | 950 | 100 | 2.0 | 930 | 30.0 | 860 |
| 5 | E | 735 | 462 | 1170 | 220 | 54.5 | 950 | 100 | 2.0 | 930 | 30.0 | 860 |
| 6 | F | 732 | 457 | 1170 | 220 | 54.5 | 950 | 100 | 2.0 | 930 | 30.0 | 860 |
| 7 | G | 738 | 451 | 1170 | 220 | 54.5 | 950 | 100 | 2.0 | 930 | 30.0 | 860 |
| 8 | H | 729 | 445 | 1170 | 220 | 54.5 | 950 | 100 | 2.0 | 930 | 30.0 | 860 |
| 9 | I | 752 | 465 | 1170 | 220 | 54.5 | 950 | 100 | 2.0 | 930 | 30.0 | 860 |
| 10 | J | 741 | 463 | 1170 | 220 | 54.5 | 950 | 100 | 2.0 | 930 | 30.0 | 860 |
| 11 | K | 733 | 450 | 1170 | 220 | 54.5 | 950 | 100 | 2.0 | 930 | 30.0 | 860 |
| 12 | L | 715 | 446 | 1170 | 220 | 54.5 | 950 | 100 | 2.0 | 930 | 30.0 | 860 |
| 13 | M | 775 | 479 | 1170 | 220 | 54.5 | 950 | 100 | 2.0 | 930 | 30.0 | 860 |
| 14 | N | 747 | 464 | 1170 | 220 | 54.5 | 950 | 100 | 2.0 | 930 | 30.0 | 860 |
| 15 | O | 743 | 466 | 1170 | 220 | 54.5 | 950 | 100 | 2.0 | 930 | 30.0 | 860 |
| 16 | P | 741 | 466 | 1170 | 220 | 54.5 | 950 | 100 | 2.0 | 930 | 30.0 | 860 |

| Steel plate No. | Secondary rough rolling step Post-secondary-rough-rolling plate thickness (mm) | Finish rolling step Reduction ratio (%) | Finish rolling step Finish rolling end temperature (° C.) | Finish rolling step Post-finish-rolling plate thickness (mm) | Finish rolling step Non-recrystallization reduction ratio*[3] (%) | Accelerated cooling step Cooling start time*[4] (s) | Accelerated cooling step Average cooling rate in plate thickness middle (° C./s) | Accelerated cooling step Cooling stop temperature (° C.) | Coiling step Coiling temperature (° C.) | Notes |
|---|---|---|---|---|---|---|---|---|---|---|
| 1 | 70 | 68.6 | 806 | 22 | 78.0 | 5 | 20 | 543 | 480 | Comparative example |
| 2 | 70 | 68.6 | 799 | 22 | 78.0 | 5 | 20 | 533 | 480 | Invention example |
| 3 | 70 | 68.6 | 808 | 22 | 78.0 | 5 | 20 | 533 | 480 | Invention example |

TABLE 2-continued

| | | | | | | | | | | |
|---|---|---|---|---|---|---|---|---|---|---|
| 4 | 70 | 68.6 | 798 | 22 | 78.0 | 5 | 20 | 539 | 480 | Invention example |
| 5 | 70 | 68.6 | 785 | 22 | 78.0 | 5 | 20 | 532 | 480 | Invention example |
| 6 | 70 | 68.6 | 782 | 22 | 78.0 | 5 | 20 | 527 | 480 | Invention example |
| 7 | 70 | 68.6 | 788 | 22 | 78.0 | 5 | 20 | 519 | 480 | Invention example |
| 8 | 70 | 68.6 | 788 | 22 | 78.0 | 5 | 20 | 520 | 480 | Invention example |
| 9 | 70 | 68.6 | 802 | 22 | 78.0 | 5 | 20 | 535 | 480 | Invention example |
| 10 | 70 | 68.6 | 791 | 22 | 78.0 | 5 | 20 | 533 | 480 | Comparative example |
| 11 | 70 | 68.6 | 783 | 22 | 78.0 | 5 | 20 | 520 | 480 | Comparative example |
| 12 | 70 | 68.6 | 765 | 22 | 78.0 | 5 | 20 | 516 | 480 | Comparative example |
| 13 | 70 | 68.6 | 833 | 22 | 78.0 | 5 | 20 | 553 | 480 | Comparative example |
| 14 | 70 | 68.6 | 797 | 22 | 78.0 | 5 | 20 | 535 | 480 | Comparative example |
| 15 | 70 | 68.6 | 801 | 22 | 78.0 | 5 | 20 | 536 | 480 | Comparative example |
| 16 | 70 | 68.6 | 809 | 22 | 78.0 | 5 | 20 | 541 | 480 | Comparative example |

*[1]$Ar_3$ (° C.) = 910—310C—80Mn—20Cu—15Cr—55Ni—80Mo (Symbols of elements each represent content (mass %) of the element in steel, and elements not included are indicated by 0)
*[2]$Ms$ (° C.) = 550—361C—39Mn—35V—20Cr—17Ni—10Cu—5(Mo + W) + 15Co + 30Al (Symbols of elements each represent content (mass %) of the element in steel, and elements not included are indicated by 0)
*[3]Total reduction ratio in austenite non-recrystallization temperature range (930° C. and lower), in secondary rough rolling step and finish rolling step
*[4]Time from end of finish rolling to start of accelerated cooling From the hot-rolled steel plate obtained as described above, a full-thickness tensile test piece in accordance with API-5L was cut such that the tensile direction was the C direction (direction perpendicular to the rolling direction). A tensile test was conducted, and a yield strength (YP), a tensile strength (TS), and a yield ratio [YR (%)=(YP/TS)× 100] were determined. Furthermore, for a Charpy impact test, a Charpy impact test piece having a V-notch and standard dimensions in accordance with JIS Z 2202 was cut from a plate thickness 1/2 position such that the longitudinal direction was the C direction. A Charpy impact test was conducted at −40° C. in accordance with JIS Z 2242, and an absorbed energy ($vE_{-40° C.}$) was determined. In addition, a press-notched full-thickness DWTT test piece in accordance with API-5L was cut such that the longitudinal direction was the C direction. An impact bending load was applied at −40° C. by dropping a weight, and a percent ductile fracture ($SA_{-40° C.}$) of the fractured surface was determined.

Furthermore, a test piece for microstructure examination was cut from a plate thickness 1/2 position. With the following method, microstructures were determined, area fractions of bainitic ferrite, martensite, and other phases were determined, and the average grain diameter of the bainitic ferrite was determined.

In addition, a test piece for the residue was cut from a plate thickness 1/2 position. Precipitates were extracted by using an electrolytic extraction method that utilizes an electrolyte solution of 10 vol % acetyl acetone-1 mass % tetramethylammonium chloride methanol. The extract was subjected to ICP emission analysis that uses the following method, to measure the amount of Nb present in the precipitates. Accordingly, the amount of Nb precipitated as Nb carbonitride was determined as the amount of Nb present in the obtained precipitates, expressed in mass % relative to the total amount of the test piece. Furthermore, the proportion of the amount of Nb precipitated as Nb carbonitride having a grain diameter of 20 nm or greater was determined.

<Microstructure Examination>

A test piece for microstructure examination was cut from a plate thickness 1/2 position of the steel plate. An L cross section thereof (a vertical cross section parallel to the rolling direction) was mirror-polished and then etched with nital. Randomly selected five fields of view were examined with a scanning electron microscope (SEM) at a magnification of 2000×. By using a microstructure photograph that was taken, microstructures were determined, and an area fraction of each of the phases was determined by image analysis. Furthermore, the average particle diameter of the bainitic ferrite was determined by using the intercept method specified in JIS G 0551.

<Amount of Nb Precipitated as Nb Carbonitride>

For the amount of Nb precipitated as Nb carbonitride, the following was conducted. A test piece was cut from a plate thickness 1/2 position. The cut test piece was subjected to constant current electrolysis (approximately 20 mA/cm$^2$) in an electrolyte solution (10 vol % acetyl acetone-1 mass % tetramethylammonium chloride methanol). The resulting residue extract was collected on a membrane filter (pore diameter: 0.02 μmφ). Dissolution was performed by using a dissolution agent of a mixture of sulfuric acid, nitric acid, and perchloric acid. By ICP emission analysis, the amount of Nb present in the residue extract was determined. The proportion of the obtained amount of Nb (amount of Nb precipitated as Nb carbonitride having a grain diameter of 20 nm or greater) to the total mass of Nb precipitated as Nb carbonitride was calculated. The results obtained are shown in Table 2.

TABLE 3

| Steel plate No. | Steel No. | Microstructure Area fraction of bainitic ferrite (%) | Average grain diameter of bainitic ferrite (μm) | Amount of Nb precipitated as Nb carbonitride (mass %) | Proportion of amount of Nb precipitated as Nb carbonitride of 20 nm or greater*1 (%) | Area fraction of martensite (%) | Types of remaining constituents*2 |
|---|---|---|---|---|---|---|---|
| 1 | A | 94 | 5.0 | 0.011 | 51 | 0 | PF |
| 2 | B | 98 | 2.6 | 0.032 | 62 | 2 | — |
| 3 | C | 99 | 3.2 | 0.034 | 62 | 1 | — |
| 4 | D | 98 | 3.8 | 0.035 | 63 | 2 | — |
| 5 | E | 99 | 3.8 | 0.035 | 63 | 1 | — |
| 6 | F | 99 | 4.4 | 0.037 | 63 | 1 | — |
| 7 | G | 99 | 5.0 | 0.039 | 64 | 1 | — |
| 8 | H | 98 | 3.8 | 0.051 | 69 | 2 | — |
| 9 | I | 99 | 3.8 | 0.035 | 63 | 1 | — |
| 10 | J | 94 | 3.0 | 0.052 | 69 | 6 | — |
| 11 | K | 95 | 4.4 | 0.037 | 72 | 5 | — |
| 12 | L | 92 | 3.2 | 0.034 | 62 | 8 | — |
| 13 | M | 93 | 3.8 | 0.035 | 63 | 0 | PF |
| 14 | N | 98 | 6.1 | 0.034 | 62 | 2 | — |
| 15 | O | 99 | 6.6 | 0.035 | 63 | 1 | — |
| 16 | P | 100 | 7.3 | 0.008 | 51 | 0 | — |

| Steel plate No. | Microstructure Area fraction of remaining constituents (%) | Tensile properties YP (MPa) | TS (MPa) | YR (%) | Toughness $vE_{-40° C.}$ (J) | $DWTTSA_{-40° C.}$ (%) | Notes |
|---|---|---|---|---|---|---|---|
| 1 | 6 | 529 | 624 | 85 | 267 | 80 | Comparative example |
| 2 | — | 578 | 705 | 82 | 363 | 95 | Invention example |
| 3 | — | 553 | 674 | 82 | 381 | 98 | Invention example |
| 4 | — | 563 | 688 | 82 | 372 | 97 | Invention example |
| 5 | — | 544 | 665 | 82 | 390 | 100 | Invention example |
| 6 | — | 549 | 671 | 82 | 381 | 98 | Invention example |
| 7 | — | 540 | 662 | 82 | 390 | 95 | Invention example |
| 8 | — | 626 | 780 | 80 | 310 | 85 | Invention example |
| 9 | — | 538 | 658 | 82 | 394 | 100 | Invention example |
| 10 | — | 523 | 679 | 77 | 252 | 70 | Comparative example |
| 11 | — | 503 | 645 | 78 | 267 | 76 | Comparative example |
| 12 | — | 559 | 736 | 76 | 233 | 63 | Comparative example |
| 13 | 7 | 487 | 596 | 82 | 289 | 80 | Comparative example |
| 14 | — | 572 | 697 | 82 | 267 | 80 | Comparative example |
| 15 | — | 512 | 627 | 82 | 397 | 80 | Comparative example |
| 16 | — | 520 | 613 | 85 | 401 | 75 | Comparative example |

*1Proportion relative to total mass of Nb precipitated as Nb carbonitride
*2PF: polygonal ferrite Table 3 demonstrates the following. The hot-rolled steel plates of Nos. 2 to 9 are invention examples and are in accordance with aspects of the present invention in terms of chemical composition and manufacturing method. The hot-rolled steel plates had a tensile strength of 640 MPa or greater, a yield ratio of 85% or less, a Charpy impact absorbed energy at −40° C. of 300 J or greater, and a percent ductile fracture of 85% or greater as determined by a DWTT test at −40° C. Thus, the hot-rolled steel plates were low-yield-ratio, high-strength, and high-toughness hot-rolled steel plates having a high absorbed energy.

In contrast, in No. 1, which is a comparative example, the C content was below the range of the present invention, and as a result, the amount of formation of polygonal ferrite that was formed during cooling was large, and, therefore, the predetermined amount of bainitic ferrite was not achieved, and also, the predetermined amount of Nb carbonitride in the microstructure was not achieved; consequently, the desired tensile strength was not achieved. Furthermore, since the amount of polygonal ferrite was large, heterophase interfaces formed with bainitic ferrite acted as initiation sites for ductile fracture and brittle fracture; consequently, the desired Charpy impact absorbed energy and DWTT property were not achieved. In No. 10, which is a comparative example, the Nb content was above the range of the present invention, and as a result, the amount of formation of hard martensite was increased; consequently, the desired Charpy impact absorbed energy and DWTT property were not achieved. In No. 11, which is a comparative example, the C content was above the range of the present invention, and as a result, the amount of formation of hard martensite was increased; consequently, the desired Charpy impact absorbed energy and DWTT property were not achieved. In No. 12, which is a comparative example, the Mn content was above the range of the present invention, and as a result, the amount of formation of hard martensite was increased; consequently, the desired Charpy impact absorbed energy and DWTT property were not achieved. In No. 13, which is a comparative example, the Mn content was below the range of the present invention, and as a result, the amount of formation of polygonal ferrite that was formed during cooling was large, and, therefore, the predetermined amount of bainitic ferrite was not achieved; consequently, the desired tensile strength was not achieved. Furthermore, since the amount of polygonal ferrite was large, heterophase interfaces formed with bainitic ferrite acted as initiation sites for ductile fracture and brittle fracture; consequently, the desired Charpy impact absorbed energy and DWTT property were not achieved. In No. 14, which is a comparative example, the Ti content was above the range of the present invention, and as a result, TiN coarsened and acted as initiation sites for ductile fracture and brittle fracture; consequently, the desired Charpy impact absorbed energy and DWTT property were not achieved. In No. 15, which is a comparative example, the Ti content was below the range of the present invention, and as a result, the effect of refining austenite grains by using the pinning effect of Ti nitride was insufficient; consequently, the desired DWTT property was not achieved. In No. 16, which is a comparative example, the Nb content was below the range of the present invention, and as a result, the effect of refining austenite grains was insufficient; consequently, the desired DWTT property was not achieved. Furthermore, the predetermined amount of Nb carbonitride in the bainitic ferrite was not achieved; consequently, the desired tensile strength was not achieved.

Example 2

Molten steel having the chemical composition of steel E, which is shown in Table 1, and molten steel having the chemical composition of steel G, which is shown in Table 1, were produced in a steelmaking process using a converter, and then slabs having a thickness of 220 mm were formed. Subsequently, a hot rolling step (heating step, primary rough rolling step, cooling step, secondary rough rolling step, and finish rolling step), an accelerated cooling step, and a coiling step were sequentially performed under the conditions shown in Table 4. Thus, hot-rolled steel plates having a plate thickness of 13 to 26 mm were manufactured.

TABLE 4

| | | | | | | Rolling step | | | | | |
|---|---|---|---|---|---|---|---|---|---|---|---|
| | | | | | | Rough rolling step | | | | | |
| | | | | | | Primary rough rolling step | | Cooling step | | Secondary rough rolling step | |
| | | Transformation temperature | | Heating step | | | Post- primary- rough- rolling plate thickness (mm) | Average cooling rate in plate thickness middle (° C./s) | Cooling stop temperature (° C.) | | Secondary rough rolling finishing temperature (° C.) |
| Steel plate No. | Steel No. | $Ar_3$*1 (° C.) | $Ms$*2 (° C.) | Heating temperature (° C.) | Slab thickness (mm) | Reduction ratio (%) | Primary rough rolling finishing temperature (° C.) | | | | Reduction ratio (%) | |
| 17 | E | 735 | 462 | 1170 | 220 | 54.5 | 950 | 100 | 2.0 | 930 | 30.0 | 860 |
| 18 | E | 735 | 462 | 1230 | 220 | 47.7 | 950 | 115 | 1.5 | 930 | 34.8 | 860 |
| 19 | E | 735 | 462 | 1170 | 220 | 63.6 | 950 | 80 | 3.0 | 920 | 25.0 | 850 |
| 20 | E | 735 | 462 | 1200 | 220 | 58.2 | 950 | 92 | 2.0 | 880 | 23.9 | 830 |
| 21 | E | 735 | 462 | 1170 | 220 | 54.5 | 950 | 100 | 2.0 | 930 | 30.0 | 860 |
| 22 | E | 735 | 462 | 1150 | 220 | 52.3 | 950 | 105 | 2.0 | 930 | 23.8 | 910 |
| 23 | E | 735 | 462 | 1170 | 220 | 54.5 | 950 | 100 | 2.0 | 930 | 30.0 | 860 |
| 24 | E | 735 | 462 | 1170 | 220 | 61.4 | 950 | 85 | 2.0 | 930 | 17.6 | 860 |
| 25 | G | 738 | 451 | 1170 | 220 | 54.5 | 950 | 100 | 2.0 | 930 | 30.0 | 860 |
| 26 | G | 738 | 451 | 1200 | 220 | 54.5 | 950 | 100 | 2.0 | 930 | 30.0 | 860 |
| 27 | G | 738 | 451 | 1190 | 220 | 76.4 | 950 | 52 | 2.0 | 930 | 30.8 | 860 |
| 28 | G | 738 | 451 | 1170 | 220 | 54.5 | 950 | 100 | 2.0 | 930 | 30.0 | 860 |
| 29 | G | 738 | 451 | 1170 | 220 | 54.5 | 950 | 100 | 2.0 | 930 | 30.0 | 860 |
| 30 | G | 738 | 451 | 1150 | 220 | 54.5 | 950 | 100 | 2.0 | 930 | 30.0 | 860 |

| | Rolling step | | | | | Accelerated cooling step | | | |
|---|---|---|---|---|---|---|---|---|---|
| | Rough rolling step Secondary rough rolling step Post-secondary-rough-rolling plate thickness (mm) | Finish rolling step | | | | | Average cooling rate in plate thickness middle (° C./s) | | |
| Steel plate No. | | Reduction ratio (%) | Finish rolling end (° C.) | Post-finish-rolling plate thickness (mm) | Non-recrystallization reduction ratio*3 (%) | Cooling start time*4 (s) | | Cooling stop temperature (° C.) | Coiling step Coiling temperature (° C.) | Notes |
| 17 | 70 | 68.6 | 785 | 22 | 78.0 | 5 | 20 | 532 | 480 | Invention example |
| 18 | 75 | 66.7 | 790 | 25 | 78.3 | 10 | 10 | 490 | 450 | Invention example |

TABLE 4-continued

| | | | | | | | | | | |
|---|---|---|---|---|---|---|---|---|---|---|
| 19 | 60 | 56.7 | 790 | 26 | 67.5 | 10 | 10 | 550 | 480 | Comparative example |
| 20 | 70 | 67.1 | 780 | 23 | 75.0 | 10 | 20 | 590 | 560 | Comparative example |
| 21 | 70 | 68.6 | 715 | 22 | 78.0 | 5 | 20 | 530 | 450 | Comparative example |
| 22 | 80 | 71.3 | 885 | 23 | 78.1 | 5 | 10 | 550 | 480 | Comparative example |
| 23 | 70 | 68.6 | 785 | 22 | 78.0 | 5 | 5 | 530 | 480 | Comparative example |
| 24 | 70 | 73.6 | 785 | 18.5 | 78.2 | 5 | 80 | 530 | 480 | Comparative example |
| 25 | 70 | 68.6 | 788 | 22 | 78.0 | 5 | 20 | 519 | 480 | Invention example |
| 26 | 70 | 73.6 | 788 | 18.5 | 81.5 | 5 | 20 | 540 | 510 | Invention example |
| 27 | 36 | 63.9 | 840 | 13 | 75.0 | 10 | 40 | 550 | 520 | Comparative example |
| 28 | 70 | 68.6 | 788 | 22 | 78.0 | 5 | 20 | 430 | 400 | Comparative example |
| 29 | 70 | 68.6 | 788 | 22 | 78.0 | 5 | 20 | 450 | 400 | Comparative example |
| 30 | 70 | 68.6 | 788 | 22 | 78.0 | 5 | 20 | 630 | 610 | Comparative example |

*[1]$Ar_3$ (° C.) = 910—310C—80Mn—20Cu—15Cr—55Ni—80Mo (Symbols of elements each represent content (mass %) of the element in steel, and elements not included are indicated by 0)
*[2]$Ms$ (° C.) = 550—361C—39Mn—35V—20Cr—17Ni—10Cu—5(Mo + W) + 15Co + 30Al (Symbols of elements each represent content (mass %) of the element in steel, and elements not included are indicated by 0)
*[3]Total reduction ratio in austenite non-recrystallization temperature range (930° C. and lower), in secondary rough rolling step and finish rolling step
*[4]Time from end of finish rolling to start of accelerated cooling As in Example 1, hot-rolled steel plates obtained as described above were subjected to a full-thickness tensile test, a Charpy impact test, and a press-notched full-thickness DWTT test. Accordingly, a yield strength (YP), a tensile strength (TS), a yield ratio [YR (%)=(YP/TS)×100], a Charpy impact absorbed energy ($vE_{-40° C.}$), and a percent ductile fracture ($SA_{-40° C.}$) were measured. The results obtained are shown in Table 5.

TABLE 5

| Steel plate No. | Steel No. | Steel microstructure Area fraction of bainitic ferrite (%) | Average grain diameter of bainitic ferrite (μm) | Amount of Nb precipitated as Nb carbonitride (mass %) | Proportion of amount of Nb precipitated as Nb carbonitride of 20 nm or greater*[1] (%) | Area fraction of martensite (%) | Types of remaining constituents*[2] |
|---|---|---|---|---|---|---|---|
| 17 | E | 99  | 3.8 | 0.035 | 63 | 1 | — |
| 18 | E | 99  | 5.0 | 0.033 | 66 | 1 | — |
| 19 | E | 99  | 7.5 | 0.023 | 36 | 1 | — |
| 20 | E | 100 | 5.8 | 0.033 | 48 | 0 | — |
| 21 | E | 91  | 3.3 | 0.037 | 64 | 0 |   |
| 22 | E | 99  | 7.7 | 0.035 | 66 | 1 | — |
| 23 | E | 93  | 3.8 | 0.035 | 63 | 0 | PF |
| 24 | E | 95  | 4.4 | 0.037 | 72 | 5 | — |
| 25 | G | 99  | 5.0 | 0.039 | 64 | 1 | — |
| 26 | G | 99  | 3.9 | 0.041 | 66 | 1 | — |
| 27 | G | 99  | 6.4 | 0.033 | 48 | 1 | — |
| 28 | G | 93  | 3.8 | 0.038 | 65 | 7 | — |
| 29 | G | 92  | 4.2 | 0.038 | 64 | 8 | — |
| 30 | G | 90  | 4.0 | 0.040 | 44 | 0 | PF, P |

| Steel plate No. | Steel microstructure Area fraction of remaining constituents (%) | Tensile properties YP (MPa) | TS (MPa) | YR (%) | Toughness $vE_{-40° C.}$ (J) | $DWTTSA_{-40° C.}$ (%) | Notes |
|---|---|---|---|---|---|---|---|
| 17 | — | 544 | 665 | 82 | 390 | 100 | Invention example |
| 18 | — | 535 | 660 | 81 | 395 | 90  | Invention example |
| 19 | — | 557 | 629 | 89 | 360 | 80  | Comparative example |

TABLE 5-continued

| 20 | — | 579 | 677 | 86 | 380 | 85 | Comparative example |
| 21 | 9 | 546 | 670 | 82 | 255 | 100 | Comparative example |
| 22 | — | 537 | 663 | 81 | 385 | 80 | Comparative example |
| 23 | 7 | 508 | 622 | 82 | 289 | 80 | Comparative example |
| 24 | — | 503 | 645 | 78 | 267 | 76 | Comparative example |
| 25 | — | 540 | 662 | 82 | 390 | 95 | Invention example |
| 26 | — | 536 | 662 | 81 | 395 | 100 | Invention example |
| 27 | — | 585 | 680 | 86 | 385 | 83 | Comparative example |
| 28 | — | 523 | 679 | 77 | 239 | 68 | Comparative example |
| 29 | — | 523 | 679 | 77 | 233 | 65 | Comparative example |
| 30 | 10 | 541 | 625 | 87 | 285 | 80 | Comparative example |

*[1] Proportion relative to total mass of Nb precipitated as Nb carbonitride
*[2] PF: polygonal ferrite, Deformed F: deformed ferrite, P: pearlite Table 5 demonstrates the following. The hot-rolled steel plates of Nos. 17, 18, 25, and 26, which satisfied the manufacturing conditions according to aspects of the present invention, are invention examples and are in accordance with aspects of the present invention in terms of chemical composition and manufacturing method. The hot-rolled steel plates had a tensile strength of 640 MPa or greater, a yield ratio of 85% or less, a Charpy impact absorbed energy at −40° C. of 300 J or greater, and a percent ductile fracture of 85% or greater as determined by a DWTT test at −40° C. Thus, the hot-rolled steel plates were low-yield-ratio, high-strength, and high-toughness hot-rolled steel plates having a high absorbed energy. In addition, in No. 26, the accumulated rolling reduction ratio for a non-recrystallization temperature range was in a suitable range, and as a result, high levels of toughness and DWTT property were achieved due to the refining of austenite.

In contrast, in No. 19, which is a comparative example, the accumulated rolling reduction ratio for a non-recrystallization temperature range was below the range of the present invention, and as a result, the effect of refining austenite grains was insufficient, which led to a coarsened average particle diameter of the bainitic ferrite; consequently, the desired DWTT property was not achieved. Furthermore, the predetermined amount of Nb carbonitride in the microstructure was not achieved; consequently, the desired tensile strength was not achieved. In No. 20, which is a comparative example, the accumulated rolling reduction ratio for a non-recrystallization temperature range was below the range of the present invention, and as a result, the proportion of Nb carbonitride of 20 nm or greater was at a low level; consequently, the desired low yield ratio was not achieved. In No. 21, which is a comparative example, the finishing delivery temperature was below the range of the present invention, and as a result, the amount of deformed ferrite was increased; this resulted in a low level of Charpy impact absorbed energy, which is associated with the occurrence of separation. In No. 22, which is a comparative example, the finishing delivery temperature was above the range of the present invention, and as a result, the effect of refining austenite grains was insufficient, which led to a coarsened average particle diameter of the bainitic ferrite; consequently, the desired DWTT property was not achieved. In No. 23, which is a comparative example, the average cooling rate during accelerated cooling was below the range of the present invention, and as a result, the amount of formation of polygonal ferrite that was formed during cooling was large, and, therefore, the predetermined amount of bainitic ferrite was not achieved; consequently, the desired tensile strength was not achieved. Furthermore, since the amount of polygonal ferrite was large, heterophase interfaces formed with bainitic ferrite acted as initiation sites for ductile fracture and brittle fracture; consequently, the desired Charpy impact absorbed energy and DWTT property were not achieved. In No. 24, which is a comparative example, the average cooling rate during accelerated cooling was above the range of the present invention, and as a result, the amount of formation of hard martensite was increased; consequently, the desired Charpy impact absorbed energy and DWTT property were not achieved. In No. 27, which is a comparative example, the accumulated rolling reduction ratio for a non-recrystallization temperature range was below the range of the present invention, and as a result, the effect of refining austenite grains was insufficient, which led to a coarsened average particle diameter of the bainitic ferrite; consequently, the desired DWTT property was not achieved. Furthermore, the proportion of Nb carbonitride of 20 nm or greater was at a low level; consequently, the desired low yield ratio was not achieved. In Nos. 28 and 29, which are comparative examples, the cooling stop temperature for the accelerated cooling and/or the coiling temperature were below the ranges of the present invention, and as a result, the amount of formation of hard martensite was increased; consequently, the desired Charpy impact absorbed energy and DWTT property were not achieved. In No. 30, which is a comparative example, the cooling stop temperature for the accelerated cooling and the coiling temperature were above the ranges of the present invention, and as a result, the amounts of ferrite and pearlite that were formed during cooling and coiling that took place after the stop of the accelerated cooling were large, and, therefore, the predetermined amount of bainitic ferrite was not achieved; consequently, the desired tensile strength was not achieved. Furthermore, heterophase interfaces formed with bainitic ferrite acted as initiation sites for ductile fracture and brittle fracture; consequently, the desired Charpy impact absorbed energy and DWTT property were not achieved. In addition, the coiling temperature was high, and as a result, fine Nb carbonitride was excessively formed, and, therefore, the proportion of Nb carbonitride of 20 nm or greater was at a low level; consequently, the desired low yield ratio was not achieved.

INDUSTRIAL APPLICABILITY

By employing a low-yield-ratio, high-strength, and high-toughness hot-rolled steel plate having a high absorbed energy according to aspects of the present invention for a line pipe, which is used to transport natural gas, crude oil, and the like, a significant contribution is made to improving transport efficiency with high-pressure operation.

The invention claimed is:
1. A hot-rolled steel plate comprising a chemical composition and a microstructure,
the chemical composition containing, in mass %,
C: 0.04% or greater and 0.08% or less,
Si: 0.01% or greater and 0.50% or less,
Mn: 1.2% or greater and 2.0% or less,
P: 0.001% or greater and 0.010% or less,
S: 0.0030% or less,
Al: 0.01% or greater and 0.08% or less,
Nb: 0.050% or greater and 0.100% or less,
Ti: 0.005% or greater and 0.025% or less,
N: 0.001% or greater and 0.006% or less, and
at least one selected from Cu: 0.01% or greater and 1.00% or less, Ni: 0.01% or greater and 1.00% or less, Cr: 0.01% or greater and 1.00% or less, Mo: 0.01% or greater and 1.00% or less, V: 0.01% or greater and 0.10% or less, and B: 0.0005% or greater and 0.0030% or less, with a balance of Fe and incidental impurities,
wherein, in the microstructure, in a plate thickness 1/2 position, an area fraction of martensite is less than 3%, an area fraction of bainitic ferrite is 95% or greater, the bainitic ferrite has an average grain diameter of 6.0 μm or less, an amount of Nb precipitated as Nb carbonitride is 0.025 mass % or greater, and an amount of Nb precipitated as Nb carbonitride having a grain diameter of 20 nm or greater constitutes 50% or greater of a total mass of the Nb precipitated as Nb carbonitride, and
wherein the hot-rolled steel plate has a tensile strength of 640 MPa or greater, a yield ratio of 85% or less, a Charpy impact absorbed energy at −40° C. of 300 J or greater, and a percent ductile fracture (SA value) of 85% or greater as determined by a DWTT test at −40° C.

2. The hot-rolled steel plate according to claim 1, wherein the chemical composition further contains, in mass %, at least one selected from
Ca: 0.0005% or greater and 0.0100% or less,
REM: 0.0005% or greater and 0.0200% or less,
Zr: 0.0005% or greater and 0.0300% or less, and
Mg: 0.0005% or greater and 0.0100% or less.

3. A method for manufacturing the hot-rolled steel plate according to claim 1, the method comprising:
forming a hot-rolled steel plate by heating a steel slab having the chemical composition to a temperature of 1100° C. or higher and 1250° C. or lower and then rolling the slab in an austenite recrystallization temperature range, and subsequently performing rolling in an austenite non-recrystallization temperature range at an accumulated rolling reduction ratio of greater than 75%, with a rolling finishing temperature being (an Ar3 temperature+30° C.) or higher and (the Ar3 temperature+130° C.) or lower;
thereafter cooling the hot-rolled steel plate to a temperature range of an Ms temperature or higher and (the Ms temperature+150° C.) or lower by accelerated cooling at an average cooling rate of 10° C./s or greater and 60° C./s or less, the temperature range and the average cooling rate being determined at a middle of a plate thickness; and
coiling the hot-rolled steel plate at a temperature of 450° C. or higher and 600° C. or lower; thereby producing the hot-rolled steel plate of claim 1.

4. A method for manufacturing the hot-rolled steel plate according to claim 1, the method comprising:
forming a hot-rolled steel plate by heating a steel slab having the chemical composition to a temperature of 1100° C. or higher and 1250° C. or lower and then subjecting the slab to primary rough rolling in an austenite recrystallization temperature range, subsequently cooling the slab to an austenite non-recrystallization temperature range at an average cooling rate of 1.5° C./s or greater, the average cooling rate being determined at a middle of a plate thickness, and performing secondary rough rolling and finish rolling in the austenite non-recrystallization temperature range at an accumulated rolling reduction ratio of the secondary rough rolling and the finish rolling of greater than 75%, with a finishing delivery temperature being (an Ar3 temperature+30° C.) or higher and (the Ar3 temperature+130° C.) or lower;
thereafter cooling the hot-rolled steel plate to a temperature range of an Ms temperature or higher and (the Ms temperature+150° C.) or lower by accelerated cooling at an average cooling rate of 10° C./s or greater and 60° C./s or less, the temperature range and the average cooling rate being determined at the middle of the plate thickness; and
coiling the hot-rolled steel plate at a temperature of 450° C. or higher and 600° C. or lower; thereby producing the hot-rolled steel plate of claim 1.

* * * * *